Sheet 1. 2 Sheets.

Tompkins & Johnson.
Knitting Mach.

No. 963. Reissued May 15, 1860.

Sheet 2. 2 Sheets

Tompkins & Johnson.

Knitting Mach.

No. 963. Reissued May 15, 1860.

UNITED STATES PATENT OFFICE.

CLARK TOMPKINS AND JOHN JOHNSON, OF TROY, NEW YORK.

IMPROVEMENT IN KNITTING-MACHINES.

Specification forming part of Letters Patent No. 13,586, dated September 18, 1850; Reissue No. 963, dated May 15, 1860.

*To all whom it may concern:*

Be it known that we, CLARK TOMPKINS and JOHN JOHNSON, of Troy, in the county of Rensselaer and State of New York, have invented certain new and useful Improvements in Rotary Knitting-Machines; and we do hereby declare that the following is a full, clear, and exact description of the construction and operation of the same, reference being had to the annexed drawings, making a part of this specification, in which—

Figure 1:
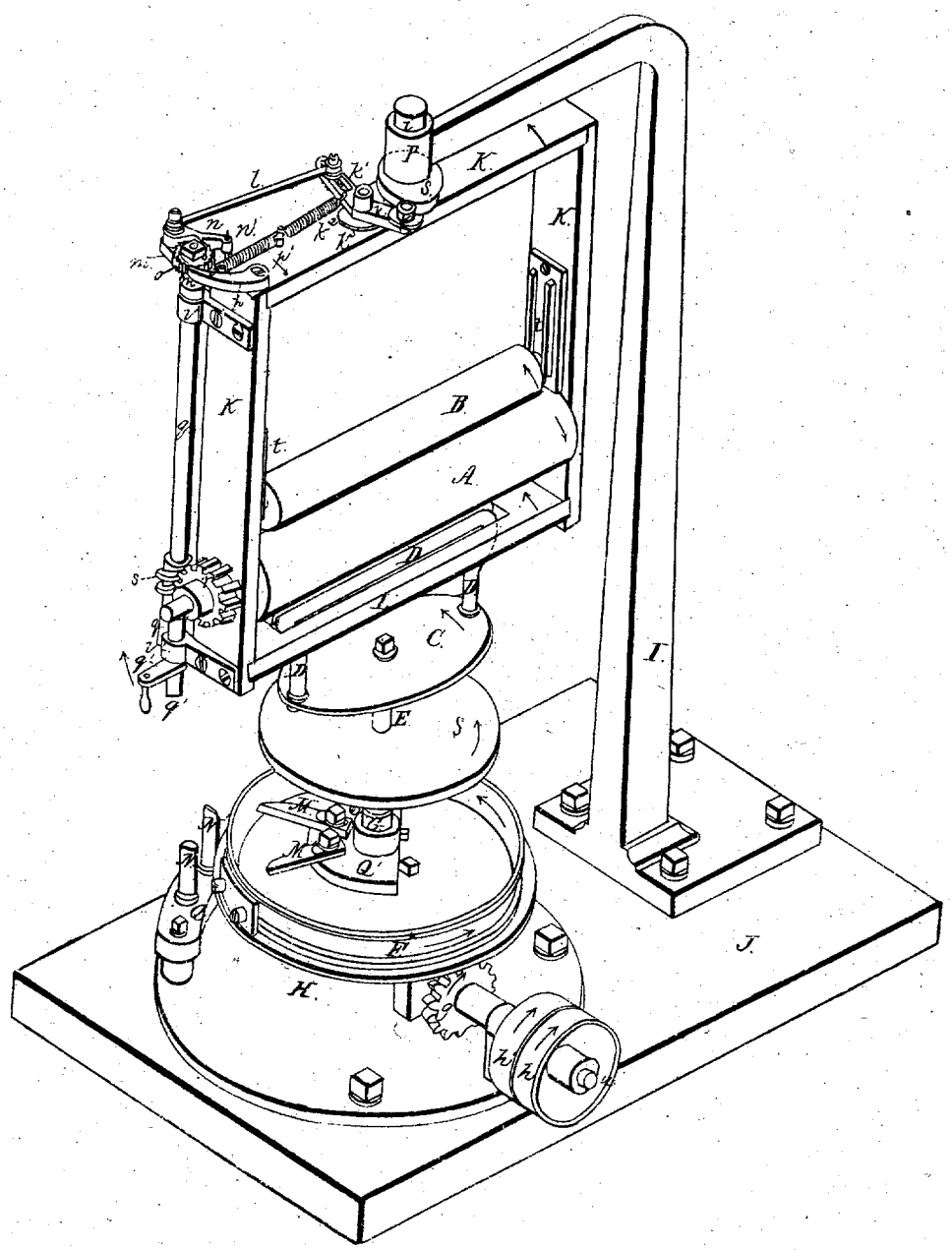
Figure 3:
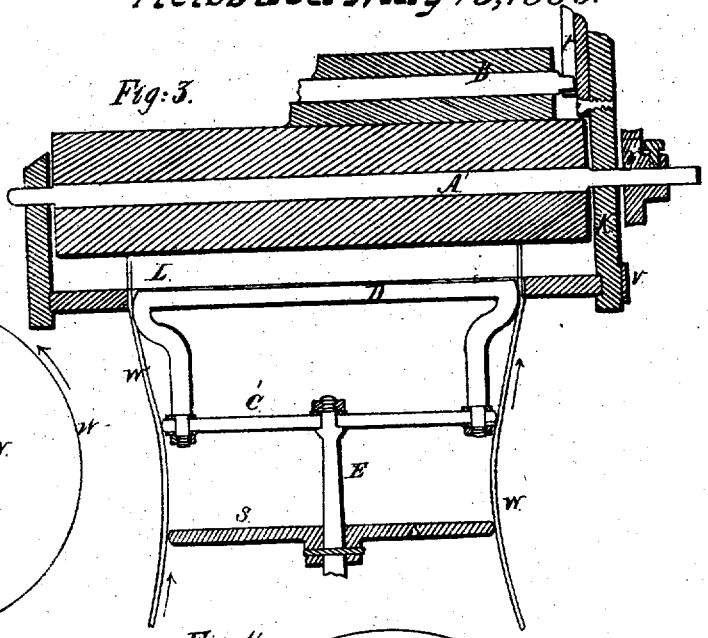
Figure 2:
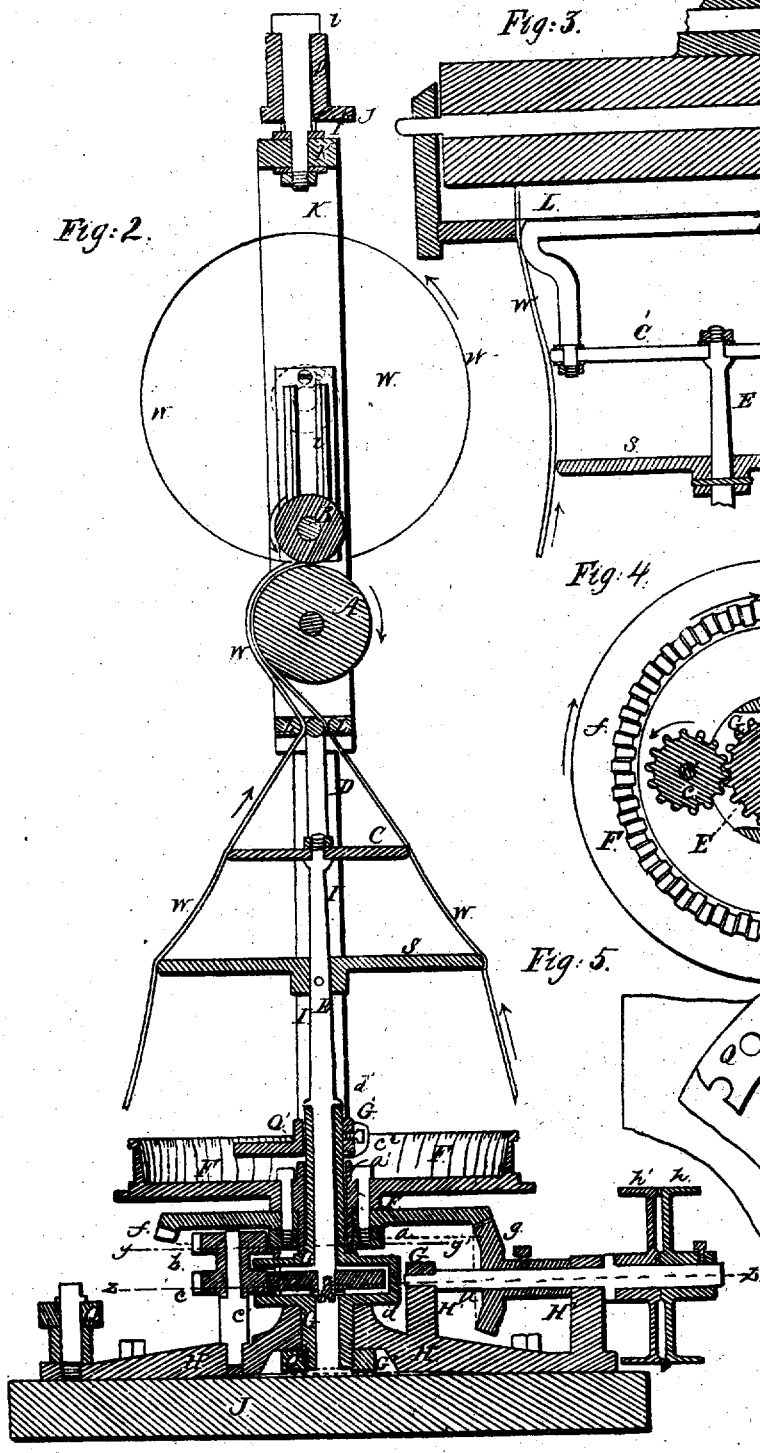
Figure 4:
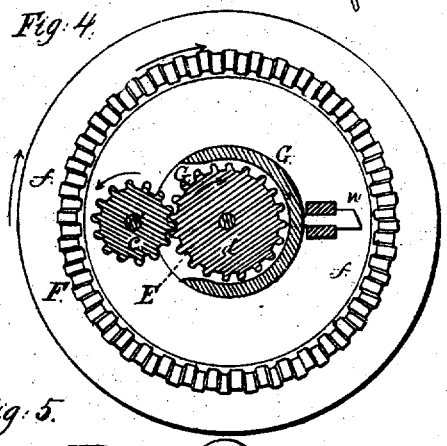

Figure 1 is an isometrical representation; Fig. 2, a vertical section through the center of the machine transverse the frame which carries the take-up rollers; Fig. 3, a longitudinal vertical section of the lower portion of the take-up frame and the parts adjacent thereto; Fig. 4, a view from beneath of a horizontal section through *z z* in Fig. 2, and Fig. 5 a top view of a horizontal section through *y y* in Fig. 2.

The same letters refer to like parts in all the figures, and the directions of motion of the several revolving parts are indicated by their respective arrows.

Our improvements in upright rotary knitting-machines consist, first, in the peculiar manner in which we cause the frame which carries the take-up mechanism to revolve in the same direction and simultaneously with the needle-cylinder; second, in the manner in which we cause each portion of the knit fabric to extend longitudinally in the same direction from the needles when presented to the action of the knitting-wheels, and otherwise keeps the tubular web in proper shape and regulates its tension while being drawn off and taken up, so as to make the goods more even in elasticity than otherwise is the case.

The construction and operation of a rotary knitting-machine as improved by us is as follows viz:

J is the common bed-plate of all the works of an upright rotary knitting-machine; H, the base-block of the knitting mechanism proper, and I a bent standard from which the take-up frame K is suspended by the spindle *i* turning within the socket P, so that said frame shall be free to be revolved.

F is the usual cylinder fitted to be turned upon the stationary hollow stud or standard G, secured to the base-block H.

N N are the ordinary posts (seen broken in Fig. 1) rising from the stand Q, for the support of the usual cloth-depresser, sinker, and presser-wheels, and M M the usual arms (seen broken in Fig. 1) for holding the common inside knitting-wheels extending from the stand Q, which is fastened to the hollow stud G.

Power to drive the machine is applied to the pulleys *h h* on the shaft *u*, which turns on the standard H H.

Figure 5:
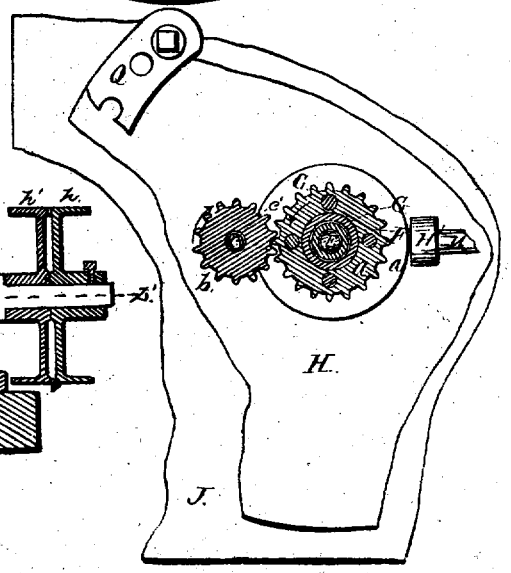

*g* is a bevel-pinion fixed on the shaft *u* to give motion to the bevel-wheel F, fastened to the hub of the needle-cylinder. *a* is a small spur-wheel fastened to and revolving with the needle-cylinder and giving motion to the spur-pinion B, fastened to its equal pinion *c*, and turning with it upon the stud *c'*. The spur-pinion *c* drives the spur-wheel *d*, which is equal in size to the wheel *a*, and is fastened to the lower end of the central spindle, E, which spindle is fitted to turn freely within the stud G. Consequently the spindle E is revolved in the same direction and with the same velocity as the needle-cylinder. We enlarge the hollow stud G so as to partly inclose the spur-wheel D, leaving one side of the thus formed case open, so that said wheel may be passed to the inside thereof, and be driven by the pinion *c* through said open side, as seen by Figs. 5, 4, and 2.

S is a circular horizontal plate fastened to the spindle E, and thus revolving inside of and simultaneously with the knit fabric W, so that all parts of the web shall extend from the circular row of needles in a uniform direction toward the axis of the machine, and thus make the action of the knitting-wheels more equal than those have been heretofore.

C is a horizontal oval plate fastened to and revolving with the spindle E, to give such shape to the web that the circular row of stitches shall be drawn off evenly and laid in straight lines upon the take-up roller. The web-flattening bent rod D is fastened to the plate C, and extends to within the slotted bottom bar of the take-up frame, thus causing the take-up frame to positively revolve in the same direction as and simultaneously with the needle-cylinder, to keep up the knit fabric straight or without twist while being drawn off and wound up by the take-up rollers A B. The roller A is made to positively revolve on its axis, in consequence of the rotation of the take-up frame by means of the fixed cam J, in connection with the combination shown in the drawings of the following elements carried by the frame K, viz: the lever $k$, with cam foller $k'$, spring $k^2$, and fulcrum $k^3$, to drive the ratchet-wheel O, fixed on the shaft Q, by means of the rod $l$, vibrating pawl $n$, with spring $n'$, and stop click $p$, with spring $p'$, the endless screw $s$, fixed on $q$, and driving worm-wheel $r$ on the shaft of the roller A. By using a larger or smaller ratchet-wheel O the work is taken up faster or slower, for the cylinder-surface of the roller A is made so rough, by coating it with sand or emery, that it does not slip at all on the knit fabric, but takes up and winds upon the incumbent roller B exactly equal lengths of the web at every revolution of said roller A, while B rises within the guides $t$ $t$ as the size of the roll of goods increases.

Having thus described a rotary knitting-machine as improved and constructed by us, we will now proceed to point out our invention more distinctly.

First. In regard to giving motion to the take-up frame. It has heretofore been usual to cause the frame which carries the take-up mechanism to revolve simply by the drag of the web, there being sometimes employed, as help to the operation, a fixed rod extending from the stationary axis of the needle-cylinder, within the tubular web, to within a long oval opening through the bottom bar of the take-up frame, and a corresponding oval plate arranged horizontally within said oval opening and fitted to turn freely upon the said central rod, so as to distend and flatten the web previous to being taken up, and thus lessen the twist therein occasioned by driving the take up frame. Now, it will be seen that our improvement in the manner of giving motion to the take-up frame consists in making the central rod revolve simultaneously with the needle-cylinder and fastening a modification of the oval plate heretofore used to the central rod or spindle, so that the inclosing take-up frame shall be positively revolved independently of the web.

We are aware that Daniel Tainter has heretofore caused the draft and take-up mechanism employed by him to revolve with the same velocity as the needle-cylinder by applying the driving-power primarily to the take-up frame as well as to the needle-cylinder; but it will be seen that his mode is substantially different from our method, wherein the take-up frame extends down and embraces a web-inclosed expansion of a revolving central spindle. Second. In reference to shaping the web while being drawn off. Heretofore several longitudinal parts of the knit fabric have been allowed to extend from the circular row of needles toward the take-up frame in various directions; hence the action of the knitting-wheels thereon has been irregular, producing variations in the elasticity of the several parts of the web. To remedy this defect in, and also to increase the velocity and smoothness of, the operations of the machine, we fasten the plates S and C to the revolving central spindle in the positions shown in the drawings.

We will here remark that it is not essential that the web-shaping plates S and C should be immovably fastened to the central spindle, for if the oval plate C, with a projection extending to within the take-up frame, and the circular plate S, were each arranged in the position represented in the drawings, but so as to be free to be turned on the central spindle and so that the plate C should be revolved by the rotating take-up frame, and the plate S, by the action of the fabric, the central spindle serving only as a support and stationary axis for these plates, the purpose for which we use them would be fulfilled thereby, and we consider such arrangement of the plates as equivalent to our hereinbefore-described method of combining them with the take-up mechanism.

Having thus fully described our invention, what we claim therein, and for which we desire Letters Patent, is—

1. The apparatus for revolving the take-up machinery in unison with the needle-cylinder, as herein specified, substantially in the manner and for the purpose set forth.

2. Revolving the shaping-plates S and C by a positive motion with and at the same velocity as the take-up motion, substantially as described, and for the purposes specified.

CLARK TOMPKINS.
JOHN JOHNSON.

In presence of—
JOHN M. LANDON,
A. D. LYON,
As to Clark Tompkins.
WM. GASTON,
A. J. ROBINSON,
Witnesses to signature of John Johnson.